United States Patent [19]

Rutherford, Sr.

[11] Patent Number: 5,115,983

[45] Date of Patent: May 26, 1992

[54] PROCESS FOR RECYCLING VEHICLE TIRES

[75] Inventor: Darrel Rutherford, Sr., Hamilton, Ohio

[73] Assignee: D & R Recyclers, Inc., Hamilton, Ohio

[21] Appl. No.: 640,925

[22] Filed: Jan. 14, 1991

Related U.S. Application Data

[63] Continuation-in-part of Ser. No. 557,152, Jul. 7, 1990, abandoned.

[51] Int. Cl.⁵ ............................................. B02C 19/00
[52] U.S. Cl. ........................................ 241/1; 241/21; 241/DIG. 31
[58] Field of Search ..................... 241/1, 15, DIG. 31, 241/301, DIG. 38, 21

[56] References Cited

U.S. PATENT DOCUMENTS

| 4,015,782 | 4/1977 | Granite | 241/DIG. 3 X |
| 4,813,614 | 3/1989 | Moore et al. | 341/DIG. 3 X |

FOREIGN PATENT DOCUMENTS

| 213339 | 5/1968 | U.S.S.R. | 241/1 |
| 1172592 | 8/1985 | U.S.S.R. | 241/1 |

Primary Examiner—Mark Rosenbaum
Assistant Examiner—Frances Chin
Attorney, Agent, or Firm—George Wolken, Jr.

[57] ABSTRACT

A method is described for the recycling of scrap vehicle tires using high pressure water jets. The use of high pressure water provides for the production of shredded rubber material in useful sizes and also provides for a separation of the shredded rubber from the cording and beading material of the tire. Recovery of steel cording material in a form suitable for reuse is one feature of the present invention. Also, the present invention avoids mechanical shredding entirely and the attendant wear on shredders from differing tire sizes and compositions.

16 Claims, 2 Drawing Sheets

PROCESS FOR RECYCLING VEHICLE TIRES

This is a continuation-in-part of application Ser. No. 07/557,152, filed Jul. 7, 1990 now abandoned.

BACKGROUND OF INVENTION

This invention relates generally to the field of recycling solid waste materials, and more particularly to processes for recycling and reclamation of useful materials from rubber vehicle tires.

The disposal of tires from automobiles, tractors, trucks etc. is a serious problem in the modern automotive economy. While some tires are suitable for retreading, many are not or the quality of retreaded tires is not acceptable to many consumers. Therefore, the disposal or recycling of scarp tires becomes a major concern.

Many methods of disposal for scrap tires have been used. Obviously, the smoke and noxious chemicals generated by uncontrolled incineration of scrap tires are no longer acceptable. Various methods to incinerate tires while avoiding air pollution have been tried, including a method of high temperature vacuum pyrolysis.

Burial in landfills is becoming increasingly difficult as landfills are closed and acceptable sites for new landfills become harder to locate. Also, the problem of malicious or accidental fires involving large accumulations of scrap tires is a serous concern to communities, leading to increased pressures for an effective solution to the tire disposal problem. The problem of disposing scrap tires is becoming such a concern that legislation is under consideration requiring tire vendors to demonstrate acceptable disposal means for each new tire placed into the stream of commerce.

Faced with the difficulties of disposal, much consideration is naturally given to recycling scrap tires for the extraction of as much useful material as possible. Finely shredded rubber from scrap tires (often called "granulite" or "crumb rubber") has been used as a fuel source commonly known as "tire derived fuel". Such fuel has been used as an energy source in the generation of electricity, in the production of paper and cement, and in various other industries. Apparently, such burning of suitably fragmented tires can be performed in an environmentally save manner if proper precautions are taken.

Also, recycled rubber from tires is used as a component of various products commonly known as "tire derived products". Such products include asphalt paving mixtures and as extenders in a variety of rubber products such as roofing materials, walk pads, carpet and flooring underlay and other products. More such products are being demonstrated as time proceeds.

Tires typically consist of a reinforcing cord (often steel cord in modern tires), woven typically into a mat, and circumferentially surrounding the tire beneath the road-contacting surface of the tread. A primary purpose of this cord is to strengthen the tire against damage from puncture or impact with holes or road debris. Modern steel cording is typically a rather high quality steel.

Tires also typically contain several heavy metal bands or wires imbedded in the rubber for support on the inner circumference of the tire, where the tire contacts the rim of the wheel. This "bead" is typically a very strong and heavy steel, difficult to shred in many mechanical shredders or causing excessive wear on the shredding devices.

In addition to cord and bead, tires also typically consist of several layers of synthetic or naturally-occurring products arranged into tread, various other plies, sidewalls, inner lining, etc. The precise composition and configuration will typically vary considerably, depending on the type of tire, its intended use and service life, desired market price, and consumer preferences. Such "rubber-like" materials may have a variety of different chemical compositions, and be arranged in differing physical configurations for each tire type, manufacturer, etc. For convenience, we will use the term "rubber" to denote all such rubber-like materials comprising vehicle tires.

Additional support and cohesion is introduced into many tires by using a fabric cord (typically nylon or rayon) imbedded in the rubber and typically located in regions of the tire not contacting the road.

Thus, for purposes of this description, we identify four components of typical vehicle tires: 1) steel cords, 2) bead 3) fabric (or non-metallic) cords, 4) rubber.

Rubber and fabric cord can typically be burned as tire derived fuel, or used in other tire derived products (occasionally following further separation and/or processing). The steel cords and beading will typically have some value as scrap metal, if separated in a reasonably clean state. A method for effecting such a separation is the primary purpose of the present invention.

Mechanical shredding is the typical method for recycling in use today. However, mechanical shredding typically does not separate the steel cords (or other cording materials) from the shredded rubber tire. Therefore, the shredded rubber is rendered useless for many additional purposes. The economic value of the scrap steel is effectively lost. Following combustion of the rubber/steel, the surface of the steel is typically too encrusted with ash and combustion by-products to make separation and recovery economically worthwhile.

In addition, typical mechanical shredding operations produce particles of rubber scrap generally too large for convenient use as a fuel or as an additive in asphalt paving. Further processing, adding to the costs, would be required to derive economic benefit from reuse of such component materials (although the patent of B. H. Granite U.S. Pat. No. 4,015,782 addresses this problem).

Wear on mechanical shredding devices is a serious concern. For this reason larger tires, such as truck or tractor, are typically not recycled. Also, even for passenger car tires, the heavy steel bead can often produce unacceptable wear on shredders. It is often recommended that tires be "debeaded" before shredding (ie, physically cut and remove the bead and immediately surrounding rubber from the rest of the tire). Clearly, such debeading adds to the cost of tire recycling and leaves the bead and attached rubber to be disposed.

Efforts to ease such problems of shredding have included the use of cryogenic fluids (liquid nitrogen) to crystallize tires into brittle matter, allowing fragmentation by mechanical crushing (U.S. Pat. No. 4,813,614). The economic advantages of using liquid nitrogen to dispose of garbage have yet to be demonstrated.

The present invention describes a method for shredding scrap tires using high-pressure water in which the steel or other cording material is naturally separated from the shredded rubber, and the rubber is produced in sufficiently small sizes to be useful in other applications (asphalt, fuel source, etc.) without further processing. Also, as a non-contact process using highly pressurized water, the problem of mechanical wear on shredders is avoided, leading to the possibility of recycling many types of tires. Also, the bead of the tire presents no particular problem for the present invention, being stripped of rubber by high pressure water without difficulty. The great majority of steel (and all of the bead) is left behind as the rest of the tire is fragmented and washed into the effluent water stream. However, small "whiskers" of steel cord may be broken from the steel cord and find itself washed into the effluent stream. (This happens more often with damaged tires presented for recycling in which the steel cord is already fragmented of partially fragmented). Form many applications (ie as tire derived fuel) trace amounts of steel are not a concern. However, for some applications (ie asphalt additive) even minuet quantities of steel are unacceptable. In contrast to other shredding procedures, the present invention produces clean steel whiskers having little surface contamination even when washed into the effluent stream. Thus, magnetic separation of trace steel from the fragmented rubber is easily accomplished.

The present invention should be contrasted with that of Tugov (USSR Patent 213,339) in which thin streams of a temperature-controlled liquid are directed under pressure to a combination of polymer (rubber) and a fabric or thread cord. The resulting effluent liquid stream contains a mixture of fragmented polymer and fabric/thread, requiring further separation and processing. Thin streams of liquid under pressure are often used to cut materials (even steel or concrete), apparently accomplished also by Tugov. The control of temperature is apparently intended to avoid damage to the polymer or fabric. The present invention requires no temperature control and specifically avoids using thin streams of liquid precisely for the purpose of avoiding unwanted cutting of the cording materials (and the attendant need for significant separation/processing of the materials in the effluent stream).

SUMMARY AND OBJECTS OF THE INVENTION

The present invention relates to a process for producing shredded rubber and steel cording material, from scrap rubber vehicle tires.

A primary object of the present invention is to provide a water-pressure process for producing shredded rubber from scrap vehicle tires in which mechanical shredding of the tires is not required.

Another object of the present invention is to recycle scrap tires producing thereby shredded rubber in sizes sufficiently small to use subsequent as tire derived fuel or in tire derived products.

Another object of the present invention is to recycle scrap tires to produce a separation of the rubber material from the cording and beading material of said tires.

Yet another object of the present invention is to separate steel tire cording from the rubber material of scrap tires.

Another object of the present invention is to recycle tires in which removal of the bead prior to processing is not needed.

Yet another object of the present invention is to recycle rubber tires in which serious fragmentation of steel cording material does not occur.

Yet another object of the present invention is to accomplish with high-pressure water separation of rubber from the cord and bead of rubber vehicle tires, in which the effluent water stream contains very small amounts of fragmented cord or bead.

Another object of the present invention is to produce scrap steel from scrap tires in reusable form, lacking significant surface contamination of the steel.

Another object of the present invention is to produce different qualities of crumb rubber in different effluent streams by using a multi-stage high pressure recycling process.

DESCRIPTION OF PREFERRED EMBODIMENTS

The present invention relates to the use of high pressure water for the recycling of scrap rubber tires. (Certain other fluids are expected to function equivalently in stripping rubber from tires when applied under pressure. However, hereinafter we simply use the term "water" for economy of language to indicate any such fluid, and to reflect our assessment that water will be the typical fluid of choice). The basic approach is to direct high pressure water onto the tire in such a way as to completely strip the rubber from the steel cord and bead. The rubber and fabric cord is typically washed away with the effluent water, leaving the steel cord and bead behind. Thus, a natural separation of crumb rubber from the metal tire components is accomplished without the need for additional separation of shredded materials from the downstream effluent water (in contrast to mechanical or water shredding of the entire tire, such as that of Tugov).

Many approaches are possible and feasible in an engineering sense for the detailed mechanics of performing this basic task. The determining factors will most likely be the economic performance of each approach. In this section we will describe several such general approaches, understanding thereby that obvious modifications and extensions of such approaches are frequently possible. We also disclose several such approaches with the assumption that different approaches will be preferred in different circumstances depending on the economics of the recovered scrap, the nature and quantity of tires to be recycled, and environmental concerns.

Figure 1:
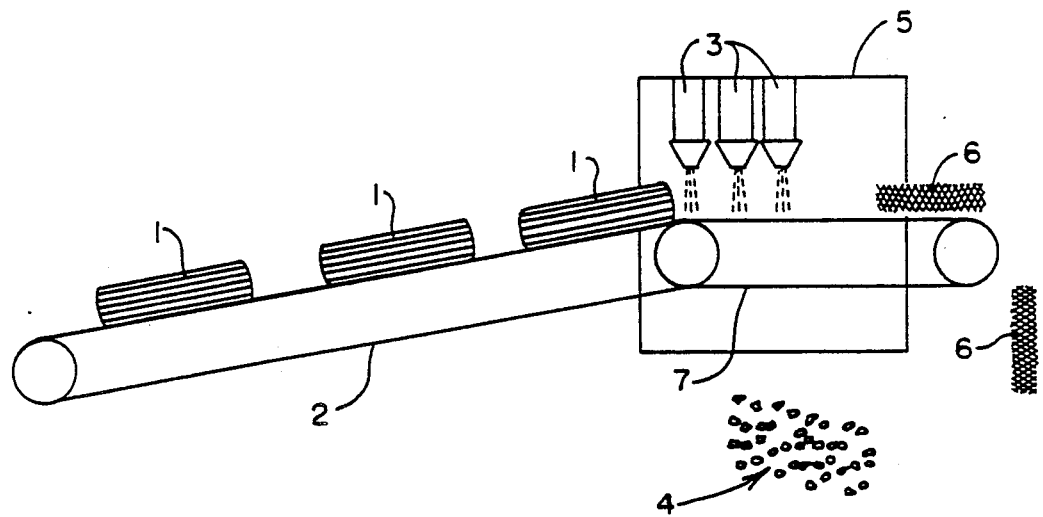
FIG. 1 A schematic drawing of the method for carrying out the process of the present invention, showing a means for transporting scrap tires to a recycling chamber (shown in cut-away) into which high pressure water is released, and the separation and recovery of shredded rubber and cording material.

FIG. 1 shows a typical schematic diagram for the recycling of scrap rubber tires using high pressure water. Scrap tires, 1, are typically placed onto a means for transporting such tires, 2, into the recycling chamber, 5, in which the high pressure water jets, 3, are located. The scrap tires are transported through recycling chamber, 5 by a suitable transport means, 7. The application of high pressure water, 3 would typically result in the production of scrap rubber particles, 4, separated from the cording material and metal bead, 6. For the recycling of steel corded tires, cording 6 will typically be recoverable steel typically having economic value in its own right (along with steel beading material for those tires processed without prior debeading). This, in summary, is the general approach of the present invention. We will now describe in more detail the various steps of the process as related to the present invention.

Typically, a conveyer belt would be used as shown as 2 in FIG. 1. However, in the recycling chamber, 5, the application of high pressure water may cause the tire to move around and lessen the efficiency of rubber stripping. If such motion of the tire, 1, is a concern, it would typically be feasible to include a retaining means for fastening the tire to the transport belt, 2. For example, a hook, clamp or other retaining means may be employed. Alternatively, or in addition, a restraining means could be employed on the means, 7, for transporting the tire through the recycling chamber 5.

Figure 2:
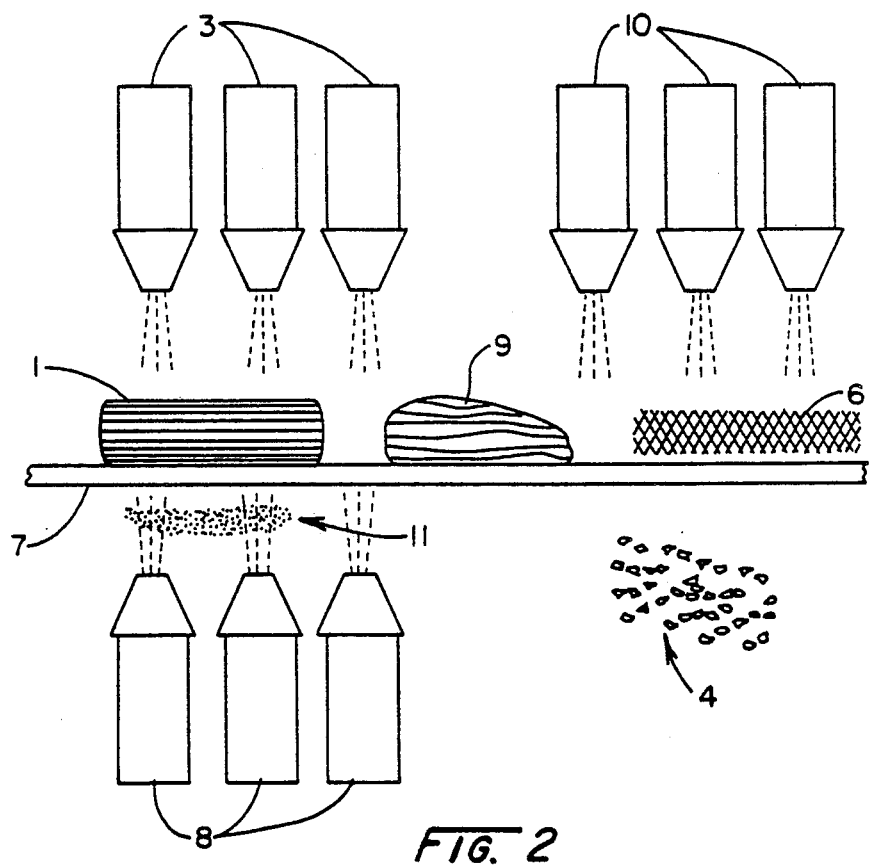
FIG. 2 A schematic drawing of the interior of the recycling chamber showing a typical two-step process for the degradation of the scrap tire followed by separation of shredded rubber and cording material.

FIG. 2 shows in more detail the processing of scrap tire, 1, as it makes its way through recycling chamber, 5. In recycling chamber, 5, high pressure water is directed on the tire to remove scrap rubber through nozzles, 3. Typically, one or more nozzles would be arranged in a line perpendicular to the direction of tire travel (that is, out of the plane of FIG. 2), creating thereby a waterfall effect for thorough tire processing. For simplicity, we show only one such nozzle in the present figures. We show in FIG. 2 a set of three nozzles, 3, directing water from one side of tire, 1 and another set of three nozzles, 8, directing water from the opposite side of the tire. It is not necessary for the practice of the present invention that several nozzles be used. Nor is it necessary that water be directed from more than one side of the tire. In practice, it is found that a single moving (or rotating) nozzle, directed at various portions of the tire in turn, is quite effective at performing the stripping and recycling operations of the present invention. In continuous operation, it is anticipated that the most economical approach will be to use a plurality of nozzles as illustrated in FIG. 2, but this is not crucial for the effective practice of the present invention. Furthermore, it is feasible for the tire to pass through recycling chamber, 5 upright and subject to high pressure water from a horizontal direction (or directions). This vertical configuration may offer practical advantages in keeping the tire, 1 firmly fixed in position when subject to high pressure water.

The technology for application of high pressure water, and the nozzles and delivery systems therefore, are well developed for pressurized-water cleaning or water-jet cutting. Such nozzles and systems are well known in the field and function, typically, adequately in practicing the present invention. In some instances, abrasive materials are added to the water stream for increased cutting or cleaning efficiency. This can be done also in the present case, typically increasing the fragmentation efficiency of the rubber-stripping process. Typically, two drawbacks will occur from the use of abrasive additives: 1) Increased wear on nozzles or other components of the water-delivery system, and 2) Abrasive material will typically be mixed with the scrap rubber. In some applications (as an asphalt additive or fuel for example) modest amounts of abrasive material mixed with the rubber will not be a serious concern. Likewise, increased rubber-stripping efficiency by the use of abrasive additives may, in some cases, more than compensate for the attendant drawbacks.

It is well known (as in the work of Tugov), that high pressure fluid will effectively cut materials when directed thereon in a thin stream. However, cutting is not the goal of the present invention. The primary goal of the present invention is to fragment and remove rubber from the steel cord and bead of tires, leaving the steel portions substantially intact for easy removal from the rubber by simple coarse-mesh filtering (typically performed simultaneously with rubber fragmentation by using a wire-mesh conveyer belt). Trace amounts of steel mixed with the crumb rubber will typically be relatively free of surface contamination, easily separated magnetically if required.

Thus, a single parameter (such as pressure) is not adequate to describe the present process for removing rubber from scrap tires. The effectiveness this process depends typically upon four important factors: 1) The water pressure employed: 2) The area over which such pressurized water is dispersed ("impacted area"): 3) The length of time the stream of pressurized water is directed to each portion of the tire, or "dwell time": 4) The flow rate of water through the nozzles. Other factors are also expected to contribute, typically of lesser importance. Some of these additional factors include the angle of water impact on the tire, the precise location on the tire being processed, the presence or absence of abrasive additives in the water stream, to mention just a few. For example, very high water pressures can be employed without fragmenting the steel cording material if the pressure is directed over a sufficiently large area. Other obvious compensating adjustments of parameters can be employed with simple testing to determine precise values.

Preliminary tests indicate that the product of water pressure times dwell time times flow rate, divided by the surface area impacted by the water stream, is a key parameter in determining process efficiency.

Defining, "Kpsi" as 1,000 psi we further define $$\alpha = \frac{[\text{pressure(Kpsi)} \times \text{dwell time(sec.)} \times \text{flow rate(gal/min)}]}{\text{impacted area(sq. in.)}}$$

Tests have been performed for single-pass processing using a pre-cut passenger car tire and water without abrasive additives directed at right angles to the outer surface of the tread through a single rotating nozzle. It is found for this particular configuration $\alpha$ in the range approximately 10 to 20 gives good stripping of all rubber leaving substantially bare steel cording with minimal fragmentation of the steel cording. Several obvious modifications in terms of multiple passes, angular impact etc. can be tested with minimal effort. Of course, use with large tractor, truck or bus tires will typically require larger $\alpha$ values, easily determinable by straightforward testing.

It is found that water pressure of 2,000 pounds per square inch ("psi") is sufficient to strip rubber from a scrap tire. However, the process is rather slow at this pressure. Pressures below 2,000 psi are quite adequate for cutting tires, but we find such low pressures impractically slow in fragmenting rubber and separating it from the cord of the tire. Thus, we use 2,000 psi as an effective lower limit to the practical water pressures employed in the present invention. Water pressure from 6,000 psi to as high as 10,000 psi also serves to strip rubber from scrap tires in the manner of the present invention. Higher pressures provide faster stripping of the rubber from the tire and also provide better and faster penetration of the cording material. Higher pressures more quickly lead to complete stripping of the cord material, although such stripping can be accomplished (albeit slower) at 2,000 psi. For pressures above about 10,000 psi, the cording material could also be shredded along with the rubber unless a compensating decrease in dwell time (or increase in surface area) occurs.

Figure 3:
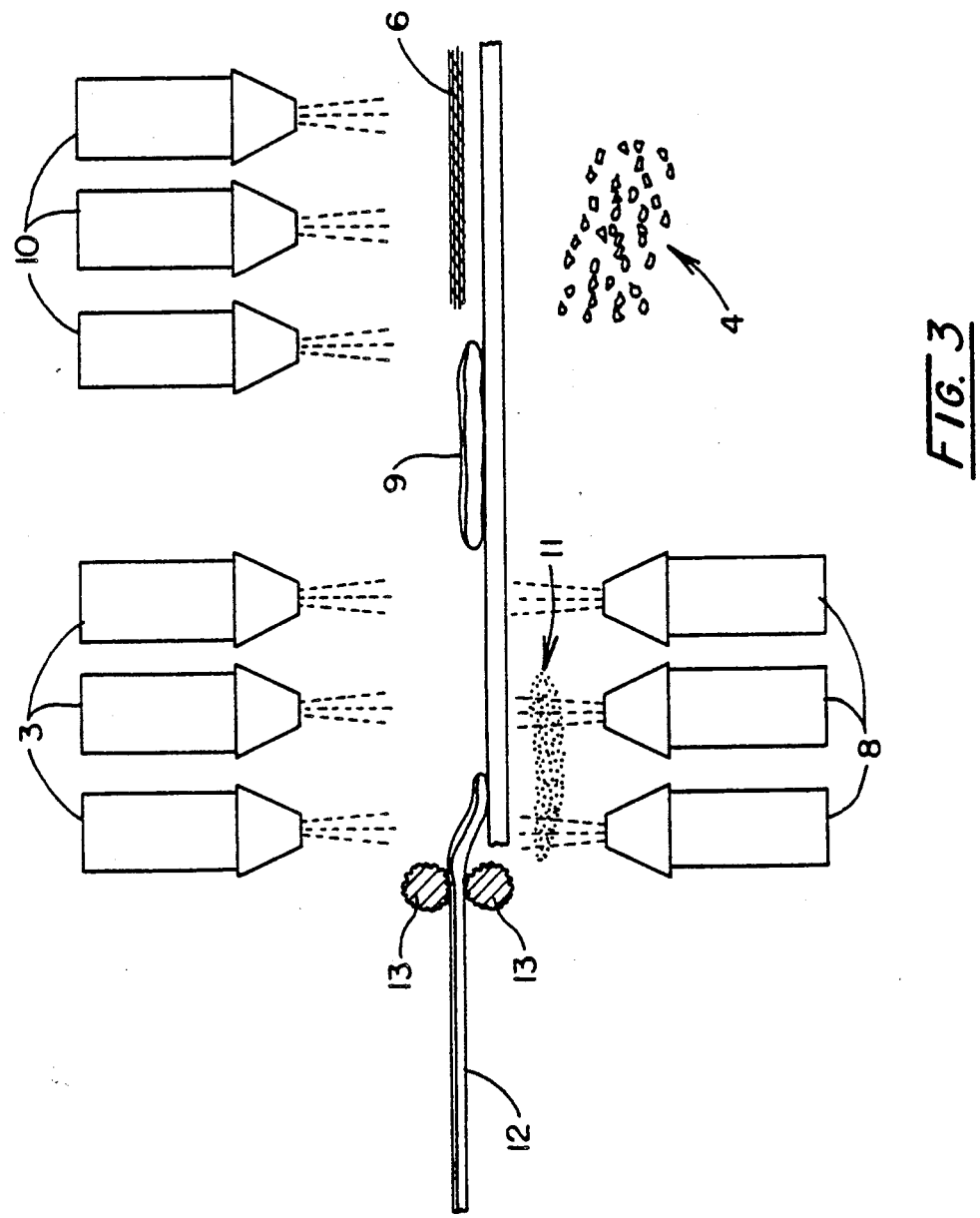
FIG. 3 Alternative embodiment of FIG. 2 for a slit tire, fed into the recycling chamber as an elongate strip between rollers.

An alternative method for delivering tires into the recycling chamber, 5 is shown in FIG. 3. It may be useful, to aid in holding the tire firmly in position for high pressure stripping, to first slit the tire completely through. Thus, the tire may be opened into a strip-like configuration, 12, and fed into the recycling chamber firmly positioned and fed by rollers, 13. Further rollers (not shown in FIG. 3) could also be employed to keep the tire moving through chamber, 5 and firmly held in position for stripping. (Debeading may be required prior to processing tires in this slit configuration).

Whether whole or slit, the tire enters the recycling chamber, 5 for stripping by means of water jets, 3 and 8. As noted above, the number of nozzles 3, and 8, as well as the configuration can be adjusted so long as all portions of the tire receives adequate exposure to high pressure water. A single nozzle, moved about the tire, will also function to practice the present invention. There are engineering and economic trade-offs to be made between the number of nozzles, the configuration of the nozzles (including whether or not the nozzles are stationary or move in some pattern, directing water to various places around the tire), and the water pressure employed. Higher pressures up to about 10,000 psi would typically be preferred for use with rotary nozzles as the dwell time of water jets on each portion of the tire would be relatively small.

FIGS. 2 and 3 illustrates a typical two-step process for separation of rubber and cording material from scrap tires. Typically, the tire, 1 will be first exposed to high pressure water in the range of approximately 3,500 psi. The purpose of this first step is to strip rubber from the tire in the form of small powder, 11. Typically, this first high pressure exposure will produce rather fine particles of rubber ("granulite") which will, typically, be useful for addition to asphalt or other tire derived products as typically practiced in the industry (perhaps after sizing, typically by passing the rubber through a screen with standard mesh). Before full penetration of the cording material occurs, the cording material with substantial amounts of rubber still attached thereto, 9, is typically moved to another location for further processing.

Following this first exposure to high pressure water, the tire will remain a mass of cording material with chunks rubber attached thereto, 9. A second wash, 10, may typically be employed to separate the remaining rubber from the cording material producing (typically) larger chunks of rubber, 4 and bare cording material, 6. Typically, the rubber produced in this second wash will be larger in size and more suitable for tire derived fuel than for the manufacture of tire derived products. The configuration, number and pressure of nozzles, 10 is not critical to the present invention as long as adequate separation of substantially all the rubber from the cord occurs. Typically, higher pressures (6,000 to 10,000 psi) will be employed in this second step to provide rapid penetration of the cord. Three fixed nozzles are shown in FIGS. 2 and 3 merely to be concrete. Many other configurations, numbers and pressures can be used (as noted above in connection with nozzles 3 and 8) as the economic and engineering practicalities of the particular process dictate. Clearly, more than two steps can be employed with various processing parameters in each step.

The water used in the process is typically collected, filtered to remove the rubber materials contained therein, and reused in the pressure system. When multi-step processing is used, it is conveniently to separately filter the effluent water from each step; thereby quickly separating different types of crumb rubber product.

The two-step process shown in FIGS. 2 and 3 is not critical to the practice of the present invention. A single-step in which high pressure water is directed on the tire for a suitable time period can equally effect a separation of the rubber from the cording material. The economic value of the tensile steel cording material typically used in modern tires is, therefore, recovered. The rubber is likewise recovered and automatically separated and washed away from the cording material, ready for reuse (or further processing, if required) as tire derived fuel or in the manufacture of tire derived products.

The two-step process described above has as a primary function the production of crumb rubber of different types by extracting it from the tire using different pressures. However, a multi-step process may also be useful when just a single pressure of water is employed. Moving the tire from place to place (typically by a conveyer) is one practical means for directing water to all portions of the tire by using different placements and different geometries of nozzles at each location. One particular configuration employs two nozzle stages sequentially along the conveyer belt using relatively high pressures (i.e. in excess of 10,000 psi). The first stage serves to strip approximately 50% of the tire. The second stage (facing a thinner tire to process) must have the nozzles positioned closer to the tire to use the same processing pressure. Alternatively, higher pressures could be used for such a second stage but this would typically be less convenient as different pumps would be required.

I claim:

1. A process for fragmenting the rubber of a rubber vehicle tire and separating said fragmented rubber from the metal cording material of said tire, comprising the steps of;
    a) directing at least one stream of water onto said tire, said water having a pressure of at least 2,000 pounds per square inch pressure; and,
    b) directing said water to all areas of said tire where rubber is located for sufficient duration to fragment said rubber and to separate said rubber from said cording material of said tire by washing said fragmented rubber away from said cording material and into the flow of effluent water leaving said cording material separate from said effluent water and said fragmented rubber therein; and,
    c) separating and recovering from said effluent water said fragmented rubber.

2. A process as in claim 1 wherein said water has a pressure of approximately 3,500 pounds per square inch pressure.

3. A process as in claim 1 further comprising the step of directing said water onto said tire by means of at least one rotary nozzle.

4. A process as in claim 1 further comprising the steps of cutting said tire and extending said tire to form an elongate strip, and directing said water onto said elongate strip.

5. A process as in claim 1 further comprising holding said tire firmly in position while directing said water thereon.

6. A process as in claim 1 wherein said water has a pressure of 10,000 pounds per square inch pressure and is directed upon said tire by means of at least one rotating nozzle.

7. A process as in claim 1 wherein said water has a pressure in the range of 2,000 to 10,000 pounds per square inch pressure.

8. A process as in claim 1 wherein said water contains abrasive additives.

9. A process for fragmenting the rubber of a rubber vehicle tire and separating said fragmented rubber from the metal cording material of said tire, comprising the steps of;
 a) directing at least one stream of first water onto said tire, said first water having a pressure of at least 2,000 pounds per square inch pressure; and,
 b) directing said first water to all areas of said tire where rubber is located for sufficient duration to fragment said rubber into relatively fine particles of rubber, washing said fine particles of rubber into the flow of a first effluent water while leaving substantial amounts of rubber attached to the cording material of said tire; and,
 c) separating and recovering from said first effluent water said fine particles of fragmented rubber; and,
 d) transporting said cording material and rubber attached thereto to a second location; and,
 e) directing at least one stream of second water onto said cording material and rubber attached thereto, said second water having a pressure of at least 6,000 pounds per square inch pressure; and,
 f) directing said second water to all portions of said cording material and rubber attached thereto for a time duration sufficient to fragment and to remove substantially all of said attached rubber as a second fragmented rubber, carrying said second fragmented rubber into a second effluent water; and,
 g) separating and recovering from said second effluent water said second fragmented rubber.

10. A process as in claim 9 wherein said first water has a pressure of approximately 3,500 pounds per square inch pressure and said second water has a pressure of approximately 8,000 pounds per square inch pressure.

11. A process as in claim 9 further comprising the step of directing at least one of said first water and said second water onto said tire by means of at least one rotary nozzle.

12. A process as in claim 9 further comprising the steps of cutting said tire and extending said tire to form an elongate strip, and directing said first and said second waters onto said elongate strip.

13. A process as in claim 9 further comprising the steps of holding said tire firmly in position while directing said first water thereon, and holding said cording material firmly in position while directing said second water thereon.

14. A process as in claim 9 wherein:
 a) said first water has a pressure in the range of 2,000 to 6,000 pounds per square inch pressure; and,
 b) said second water has a pressure in the range of 6,000 to 10,000 pounds per square inch pressure.

15. A process as in claim 9 wherein at least one of said first water and said second water contains abrasive additives.

16. A process for fragmenting the rubber of a rubber vehicle tire and separating said fragmented rubber from the metal cording material of said tire, comprising the steps of;
 a) directing at least one stream of first water onto said tire, said first water directed onto said tire by means of at least one rotary nozzle at a fixed first stand-off distance from said tire, and said first water having a pressure of at least 10,000 pounds per square inch pressure; and,
 b) directing said first water onto said tire for sufficient duration to fragment a first portion of said rubber attached to said tire, washing said first portion of fragmented rubber into the flow of a first effluent water; and,
 c) transporting said tire to a second location; and,
 d) directing at least one stream of second water onto said tire by means of at least one rotary nozzle at a fixed second stand-off distance from said tire, said second water having a pressure of at least 10,000 pounds per square inch pressure, and wherein said second stand-off distance is smaller than said first stand-off distance, compensating thereby for thinning of said tire by said first water; and,
 e) directing said second water to all portions of said tire for a time duration sufficient to fragment and to remove substantially all rubber as a second fragmented rubber, carrying said second fragmented rubber into a second effluent water; and,
 f) separating and recovering from said first and second effluent waters said fragmented rubber.

* * * * *